United States Patent
Koopman, Jr.

(10) Patent No.: US 12,539,887 B2
(45) Date of Patent: Feb. 3, 2026

(54) ENVIRONMENT MONITORING DEVICE FOR AN AUTONOMOUS VEHICLE THAT PERFORMS DIFFERENT VEHICLE RESPONSES BASED ON VIOLATION OF A PLURALITY OF SAFETY ENVELOPES

(71) Applicant: Edge Case Research, Inc., Pittsburgh, PA (US)

(72) Inventor: Philip J. Koopman, Jr., Pittsburgh, PA (US)

(73) Assignee: Edge Case Research, Inc., Pittsburgh, PA (US)

(*) Notice: Subject to any disclaimer, the term of this patent is extended or adjusted under 35 U.S.C. 154(b) by 167 days.

(21) Appl. No.: 17/312,836

(22) PCT Filed: Dec. 10, 2019

(86) PCT No.: PCT/US2019/065559
§ 371 (c)(1),
(2) Date: Jun. 10, 2021

(87) PCT Pub. No.: WO2020/123567
PCT Pub. Date: Jun. 18, 2020

(65) Prior Publication Data
US 2022/0055664 A1 Feb. 24, 2022

Related U.S. Application Data

(60) Provisional application No. 62/777,971, filed on Dec. 11, 2018.

(51) Int. Cl.
*B60W 60/00* (2020.01)
*B60W 30/09* (2012.01)
(Continued)

(52) U.S. Cl.
CPC ........ *B60W 60/0053* (2020.02); *B60W 30/09* (2013.01); *G05D 1/0214* (2013.01); *B60W 2400/00* (2013.01); *B60W 2540/229* (2020.02)

(58) Field of Classification Search
CPC ....... B60W 60/0053; B60W 2540/229; B60W 30/09; G05D 1/0214
See application file for complete search history.

(56) References Cited

U.S. PATENT DOCUMENTS 10,228,691 B1 * 3/2019 Pounds ................... G01S 13/88
10,468,062 B1 * 11/2019 Levinson ................ G01S 7/497
(Continued)

FOREIGN PATENT DOCUMENTS

WO 2017079349 A1 5/2017

OTHER PUBLICATIONS

Extended European Search Report for Application No. EP19896071 mailed on Aug. 25, 2022, 8 pages.
(Continued)

*Primary Examiner* — Scott A Browne
*Assistant Examiner* — Rami Nabih Bedewi
(74) *Attorney, Agent, or Firm* — Babst Calland Clements & Zomnir, PC; Thomas Joseph (57) ABSTRACT

Human supervisor failures in autonomous system operations are detected. Perception sensor data input is obtained from a sensor. A violation of a safety envelope by at least one external object is detected within the perception sensor data input. A response to the violation of the safety envelope is triggered. The safety envelope has predetermined dimensions that are based upon an expected time to mitigate the violation of the safety envelope.

15 Claims, 5 Drawing Sheets

(51) Int. Cl.
  *B60W 40/08* (2012.01)
  *G05D 1/00* (2006.01)
  *G05D 1/02* (2020.01)
  *G08G 1/00* (2006.01)
  *G08G 1/04* (2006.01)
  *G08G 1/13* (2006.01)
  *G08G 1/16* (2006.01)

(56) References Cited

U.S. PATENT DOCUMENTS

| | | | | |
|---|---|---|---|---|
| 2011/0046845 | A1* | 2/2011 | Kozlay | G06Q 30/018 |
| | | | | 705/317 |
| 2013/0124041 | A1* | 5/2013 | Belser | G08G 1/168 |
| | | | | 701/41 |
| 2015/0239437 | A1* | 8/2015 | Ignaczak | B60T 8/171 |
| | | | | 701/70 |
| 2017/0043781 | A1* | 2/2017 | Prakah-Asante | B60W 40/08 |
| 2017/0336788 | A1 | 11/2017 | Iagnemma | |
| 2018/0099678 | A1* | 4/2018 | Absmeier | B60R 16/037 |
| 2018/0126901 | A1* | 5/2018 | Levkova | B60W 40/09 |
| 2018/0158197 | A1 | 6/2018 | Dasgupta et al. | |
| 2018/0174462 | A1* | 6/2018 | Um | B60W 30/09 |
| 2018/0261095 | A1 | 9/2018 | Qiu et al. | |
| 2018/0307245 | A1 | 10/2018 | Khawaja et al. | |
| 2018/0342113 | A1 | 11/2018 | Kislovskiy et al. | |
| 2018/0348775 | A1 | 12/2018 | Yu et al. | |
| 2020/0086873 | A1* | 3/2020 | Tahmasbi-Sarvestani | G08G 1/16 |
| 2020/0184027 | A1* | 6/2020 | Dolan | G01S 7/4052 |
| 2020/0186979 | A1* | 6/2020 | Liu | H04W 40/248 |

OTHER PUBLICATIONS

He, K., "Mask RCNN, arXiv: 1703.06870 [cs.CV]," revision of Jan. 24, 2018, 12 pages.

Pezzementi, Z., "Putting Image Manipulations in Context: Robustness Testing for Safe Perception," IEEE International Symposium on Safety, Security, and Rescue Robotics (SSRR), Aug. 2018, 8 pages.

Redmon J. and Farhadi A., "YOLOv3: An Incremental Improvement," arXiv: 1804.02767v1 [cs.CV], revision as of Apr. 8, 2018, 6 pages.

International Search Report in PCT/US2019/065559 mailed Feb. 21, 2020.

* cited by examiner

ENVIRONMENT MONITORING DEVICE FOR AN AUTONOMOUS VEHICLE THAT PERFORMS DIFFERENT VEHICLE RESPONSES BASED ON VIOLATION OF A PLURALITY OF SAFETY ENVELOPES

CROSS REFERENCE TO RELATED APPLICATIONS

This patent application is an international application and claims priority from U.S. Provisional Application Ser. No. 62/777,971 entitled "METHOD AND APPARATUS FOR MONITORING PERFORMANCE AND SAFETY OF HUMAN-SUPERVISED AUTONOMOUS SYSTEMS" filed Dec. 11, 2018, the entire specification of which is incorporated by reference herein.

FIELD OF THE INVENTION

The present invention relates to novel approaches for an Autonomous Vehicle Performance Monitoring System ("AVPMS"). More particularly, the invention relates to a system for detecting violations of safety envelopes to provide data on human safety supervisor alertness and effectiveness.

BACKGROUND OF THE INVENTION

Autonomous vehicles (generically, AVs) use computer-based controls to automate at least some aspects of vehicle operation, such as speed control and lane keeping assist. In addition to more conventional sensors, such as speed sensors, AVs commonly rely upon data from sensors such as cameras (visible light, infrared), LIDAR, radar, ultrasound acoustic sensors, and other similar sensors to provide data to perception systems (e.g., detection, classification, and prediction of aspects of the operational environment such as vehicles, pedestrians, other objects, roadway, infrastructure, and weather). In addition to all these types of sensors, humans can function as part of the control system as well. They can participate either as part of moment-to-moment vehicle control (e.g., human steers while vehicle maintains speed) or as a supervisor of safety of one or more autonomous systems. In a combined AV-human system, the human supervisor is responsible for monitoring at least some aspects of AV operation to ensure safety. The human supervisor is generally able to intervene via autonomy disengagement, takeover, override, or other interaction with the vehicle, if necessary, to maintain safe vehicle operation.

Failure of the human portion in a combined AV-human system can have tragic consequences. A recent NTSB investigation into a fatal collision between an AV and a pedestrian in Arizona revealed that one of the causes of the incident was the failure of the human supervisor to closely monitor the road and the operation of the AV. Ensuring safety using a human supervisor requires that the human be appropriately alert, able to identify risky situations, and able to successfully react to risky situations to ensure safety.

Some available technologies to monitor the human include a perception-based Supervisor Performance Monitoring Systems (SPMS), such as the Mobileye Advanced Driver Assistance System, for real time collision avoidance as known in the art. Such systems employ similar perception capabilities to those in an AV to determine whether a human supervisor is operating the vehicle in a safe manner. For example, a SPMS might monitor the distance between a leading vehicle and the ego vehicle and take action if the following distance is too close to be safe. An example of such a following distance might be determined by a fixed rule-of-thumb such as the two-second or three-second following rule commonly taught in driver's license training materials.

Alternately, the following distance might be enforced by a more specific algorithmic approach such as the Responsibility-Sensitive Safety (RSS) algorithm promoted by MOBILEYE®. MOBILEYE® is a registered trademark of Mobileye Vision Technologies Ltd. of Jerusalem, Israel. Enforcement of the following distance is performed via an alert to the human supervisor such as one or more of a flashing light, an audible alarm, a steering wheel shaking device, or the like.

Enforcement of safety rules might also be performed by activating emergency vehicle controls such as an Automatic Emergency Braking (AEB) or similar vehicle safety and shutdown capability. Potential detection capabilities not necessarily all addressed by RSS include not only following distance, but also whether lane changes are safe, whether cross-traffic will be avoided at intersections, pedestrian avoidance, other obstacle avoidance, whether speed is appropriate for the road surface conditions, and so on.

Another technology is using a camera, steering wheel motion sensor, pedal sensor, or other sensor data to infer whether a human supervisor is paying attention. A Supervisor Monitoring (SM) system uses sensor data to infer human supervisor attentiveness to the dynamic driving task. For example, pressure on the steering wheel might be sensed, or an inward-pointing camera might be used to monitor human supervisor gaze and human supervisor facial expressions to determine if the human supervisor is alert and attentive.

While the aforementioned systems and technologies address some of the needs, what is still needed is additional ways to improve the control systems of AVs and to enhance the safety systems incorporated therein. Further, the ability to monitor the performance of human safety supervisors and to detect their failures or inattentiveness would be beneficial. Additionally, the ability to mitigate such failures is desired.

SUMMARY OF THE INVENTION

In a first aspect, a system for detecting human supervisor failures in autonomous system operations having a memory or other data storage facility and one or more processors is provided. Perception sensor data input is obtained from one or more sensors. A violation of a safety envelope by at least one external object is detected within the perception sensor data input. A response to the violation of the safety envelope is triggered. The safety envelope has predetermined dimensions that are based upon an expected time required to mitigate the risk presented by the violation of the safety envelope that is triggered.

In a second aspect, a computer-implemented method is implemented for detecting human supervisor failures in autonomous system operations. Perception sensor data input is obtained from a sensor for measuring interactions between an external object and a safety envelope. A violation of the safety envelope by the external object is detected within the perception sensor data input. A response to the violation of the safety envelope with the response being based upon an expected time required to mitigate the risk presented by the violation of the safety envelope that is triggered.

DETAILED DESCRIPTION OF THE DRAWINGS

This disclosure is directed to methods and apparatus, within an autonomous ground or air vehicle that include a human supervisor, that evaluate the performance of the human safety supervisor and/or the autonomy functions. In embodiments, an AVPMS detects violations of safety envelopes to provide data on human safety supervisor alertness and effectiveness. Each violation of successively riskier safety envelopes will trigger a set of alerts and activate other actions, such as logging human supervisor attentiveness and vehicle operational information. In some embodiments, the AVPMS will include a trigger that activates upon a breach of a safety envelope to provide a human safety supervisor or human supervisor with sufficient time to identify, plan, and start execution of a mitigation of an autonomous system malfunction.

Figure 1:
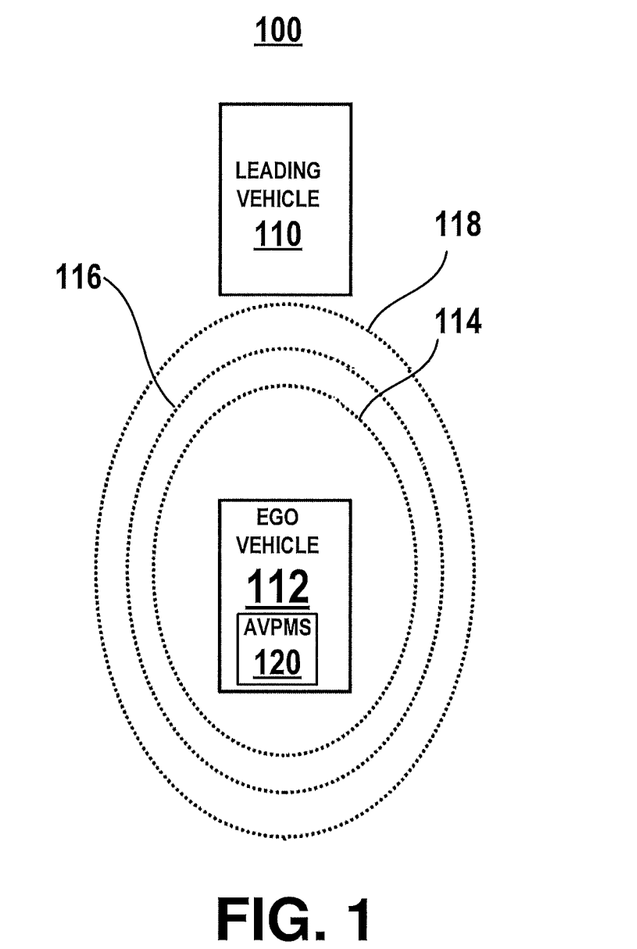
FIG. 1 is schematic diagram of an ego vehicle, a leading vehicle, and three safety envelopes on a roadway as seen from above.

FIG. 1 depicts a roadway, generally designated by the numeral 100, upon which a leading vehicle 110 and an ego vehicle 112 are travelling. In this exemplary embodiment, the ego vehicle 112 is positioned behind the leading vehicle 110. The ego vehicle 112 is surrounded by three safety envelopes 114-118 that represent different levels of risk for the leading vehicle 110 to crash into the ego vehicle 112. The ego vehicle 112 can be equipped with an AVPMS 120 that can be triggered to provide one or more responses to a violation of one or more of the safety envelopes 114-118.

The AVPMS 120 has capabilities beyond conventional SPMS systems, including the ability to monitor and enhance the safety of an AV operating with a human supervisor, such as ego vehicle 112. The AVPMS 120 improves upon conventional SPMS systems because it is not merely designed to monitor the performance of a human acting in the role of a supervisor, but rather, the AVPMS 120 monitors the combination of human and AV performance as they work together to ensure safe vehicle operation.

In certain embodiments, the AVPMS 120 can utilize the safety envelopes 114-118 to respond to risks associated with the leading vehicle 110 and other external objects. Safety envelope 114 has predetermined dimensions that represent a threshold risk upon which the ego vehicle 112 will crash into the leading vehicle 110 when the leading vehicle 110 performs a high deceleration braking maneuver. Safety envelope 116 has predetermined dimensions that represent a threshold risk upon which the ego vehicle 112 will crash into the leading vehicle 110 when the leading vehicle 110 is within a predetermined distance of the ego vehicle 112. Safety envelope 118 has predetermined dimensions that represent a threshold risk upon which the ego vehicle 112 will crash into the leading vehicle 110 when the leading vehicle 110 is within another predetermined distance of the ego vehicle 112.

The risk of the ego vehicle 112 crashing into the leading vehicle 110 is inversely related to the distance between the leading vehicle 110 and ego vehicle 112. In certain embodiments, the safety envelope 118 has the largest threshold distance between the leading vehicle 110 and the ego vehicle 112, so that the risk of a crash occurring is smallest. Similarly, the safety envelope 114 has the smallest distance and the largest risk. Additionally, it should be understood that other vehicle geometries and safety envelope considerations can be applied depending upon full scope of safety, including aspects covered by RSS.

The AVPMS 120 represents an improvement over conventional SPMS-type systems and, in particular, improves the safety capabilities of the ego vehicle 112. Conventional SPMS-type systems are unsuitable for monitoring AVs, such as the ego vehicle 112, because conventional SPMS-type systems are not configured to take into account the additional time it takes for a human supervisor to re-engage with vehicle operations. In particular, conventional SPMS-type systems are not configured provide human supervisors with enough time to regain situational awareness, move hands to controls, etc., since human supervisors must re-engage with the vehicle to perform corrective safety maneuvers.

Additionally, conventional SPMS-type systems are unsuitable for systems that monitor AVs because the systems are configured with warning parameters that are based upon the assumption that the human supervisor is in control and therefore engaged with the driving task. Such systems are configured to send alerts when a human supervisor violates a predetermined following distance, such as a distance that conforms to the "two second following rule". Since the "two second following rule" is based upon the performance of a human supervisor in a conventional vehicle, it is generally unsuitable for use with AVs because the two seconds may be too short or too long to ensure the safety of an AV and to permit the AV to maintain an optimal following distance that takes into account the timing needs of a human supervisor.

Additionally, the "two second following rule" is unsuitable because SPMS-type systems are configured to issue a warning to give an actively engaged human supervisor just enough time to react to make the vehicle safe. The alert parameters (i.e., the following distance that triggers an alert) of a conventional SPMS-type system can be modeled, generally, on a combination of human reaction time to the SPMS alert, plus the distance required for a human to react with a safety maneuver. Such distances can be the distance for a human to identify a risky situation and perform a panic stop in case of being too close to an object ahead. Similar principles apply to a lateral movement, which can apply when a vehicle drifts out of a lane, takes a corner at too high a speed, and/or requires a warning of a tailgating vehicle.

The AVPMS 120 differs from conventional SPMS-type systems because the AVPMS 120 monitors the environment and control actions of an AV system that includes both autonomy and a human who is supervising at least some aspect of autonomy. The AVPMS 120 further represents an improvement over conventional SPMS-type systems that perform operations that are augmented and improved to account for the different requirements of AV monitoring. The AVPMS 120 can incorporate a model of human re-engagement time into the typical settings that would be incorporated into a conventional SPMS, which, generally, results in increased required stand-off distances to ensure sufficient response time for mitigating autonomy failures.

The AVPMS 120 can be further modified to adjust alert thresholds to favor identifying an increased number of true positives, even if that result comes at the expense of an elevated false positive rate. In this context, an example of a true positive is a situation in which the ego vehicle is detected as being dangerously close to a lead vehicle. An example false positive is a situation in which the ego vehicle is safely distant from the lead vehicle, but due to a detection algorithm anomaly the situation is incorrectly reported as being dangerous. For completeness, a false negative would be an undetected dangerous following distance, and a true negative would be a safe following distance that is in fact treated by the AVPMS as being safe. Additional information from a supervisor monitoring capability is used to refine the human re-engagement time model.

The AVPMS 120 further differs from conventional SPMS-type systems because it can measure the failure rate of the human supervisor to supervise the autonomy. The AVPMS 120 detects faults that are due to mistakes that are made by an autonomous control system, as opposed to mistakes that are made by human supervisors. The AVPMS 120 measures both the rate of autonomy performance failures and the rate of human supervisor failures. Note that human supervisor failures in which the supervisor intervenes—when no intervention is actually required—can result in an elevated false positive rate on failure detections if not distinguished from autonomy failures. As an example, a "disengagement" in which the human supervisor thinks a crash might occur and disengages or overrides the autonomous control system, but in which the autonomy system is actually behaving correctly, results in an artificially elevated failure rate estimate for the autonomy system unless there is a way to determine that the human supervisor committed a false positive disengagement.

Figure 2:
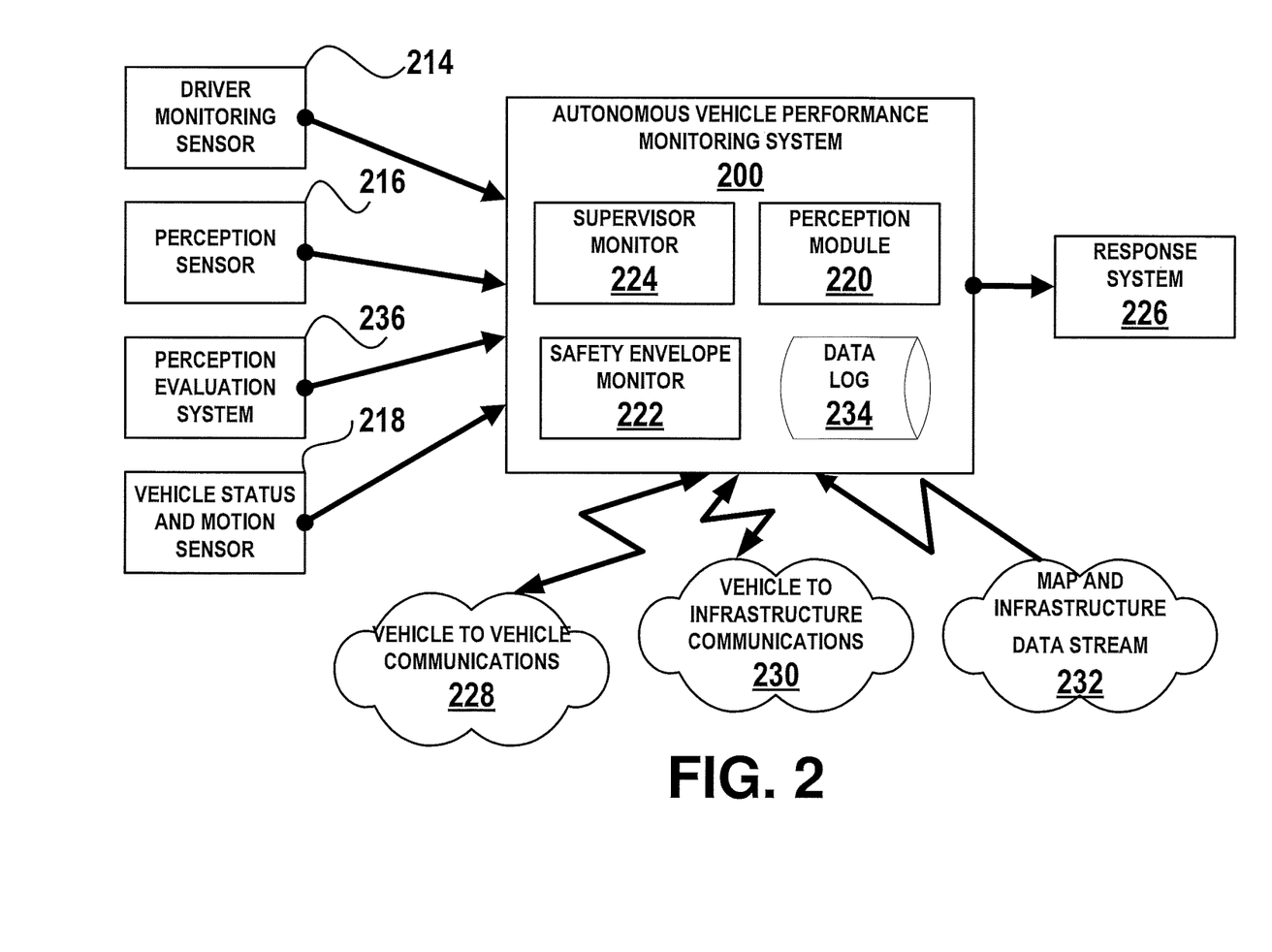
FIG. 2 is a block diagram of a configuration of an AVPMS in accordance with this disclosure.
Figure 3:
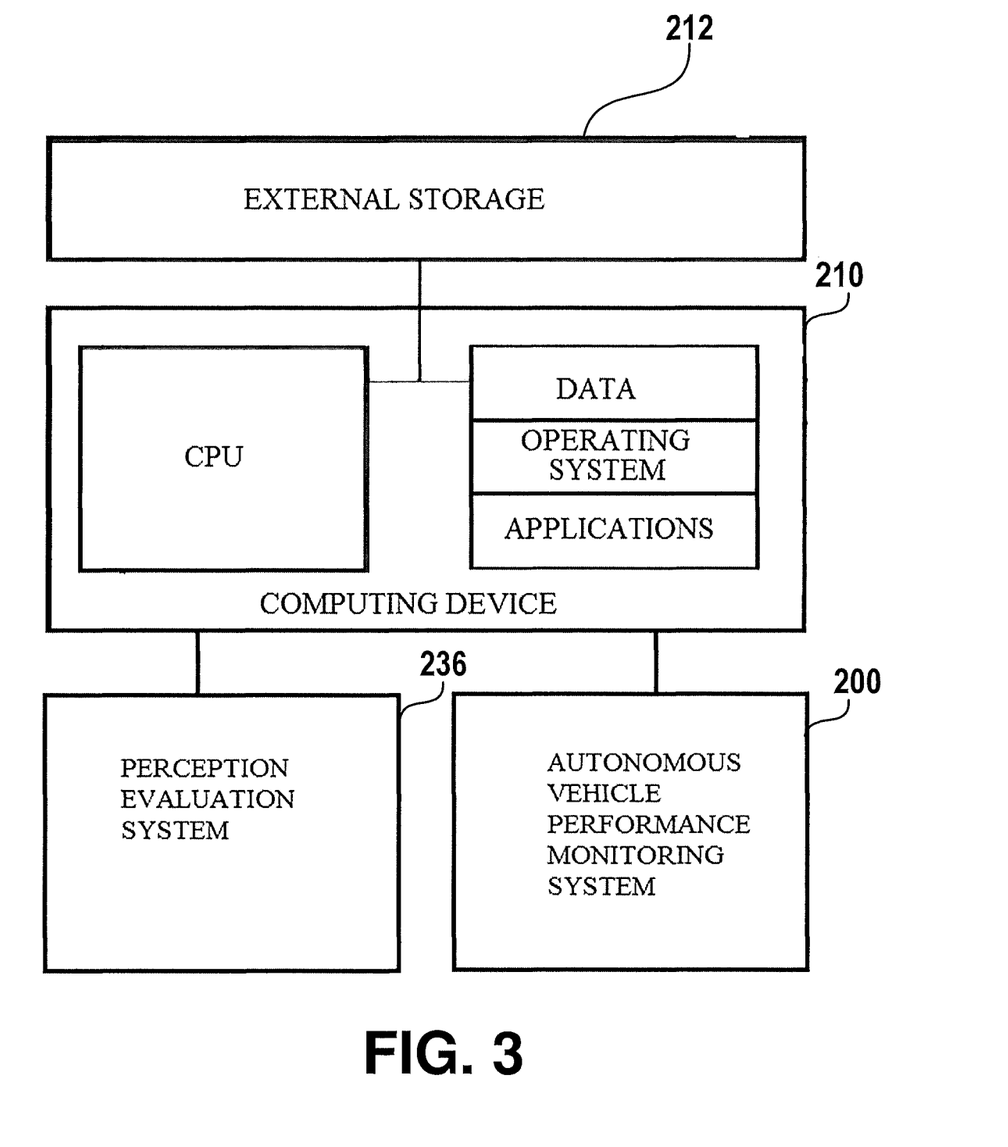
FIG. 3 is a block diagram of an apparatus that can implement an embodiment of an AVPMS.

Referring now to FIGS. 2-3 with continuing reference to the foregoing figure, an AVPMS, generally designated by the numeral 200, is shown. In certain embodiments, AVPMS 200 can be implemented as a module on a computing device, such as the computing device 210, that communicates with external storage device 212. The computing device 210 can be implemented on or otherwise incorporated into an AV. The AVPMS 200 can be substantially equivalent to the AVPMS 120 shown in FIG. 1.

The AVPMS 200 can receive input data from one or more supervisor monitoring sensors (e.g., supervisor gaze, drive alertness) 214, one or more perception sensors 216 (e.g., LIDAR, video, infrared video, ultrasonic sensors, radar), and vehicle status and motion sensors 218 (e.g., own vehicle speed, roadway frictional force, vehicle health, current braking capability).

The sensor input data can be communicated to a perception module 220, a safety envelope monitor 222, and a supervisor monitor 224 that are implemented on the computing device 210 by the AVPMS 200. The perception module 220 can be configured to determine the location and behaviors of objects and the environment in a manner as is known in the art. The safety envelope monitor 222 can monitor safety envelopes, such as the safety envelopes 114-118 shown in FIG. 1. The safety envelope monitor 222 can be triggered when one or more external vehicles, such as the leading vehicle 110 shown in FIG. 1, violates the safety envelopes 114-118.

The AVPMS 200 can communicate with a response system 226, which can be triggered to log violations of the safety envelopes 114-118 shown in FIG. 1 in some embodiments. In other embodiments, the response system 226 can be triggered to engage an AV to perform safety maneuvers. In yet other embodiments, the response system 226 can be triggered to send warnings to a human supervisor. In still other embodiments, the response system 226 is configured to perform all three functions upon detection of violations of the safety envelopes 114-118.

In certain embodiments, the AVPMS 200 can implement the supervisor monitor 224 to monitor the ability of an AV with human supervision to operate safely. In certain embodiments, the supervisor monitor 224 can be specifically configured for supervising AVs, which can differ from monitoring human-only driving performance. Additionally, the supervisor monitor 224 can provide for supervisor interventions in conjunction with other techniques to enhance the detection of perception system failures.

In some embodiments, the AVPMS 200 can obtain additional data and information through vehicle to vehicle (V2V) communication networks 228 and vehicle to infrastructure (V2I) communication networks 230. In other embodiments, the AVPMS 200 can access map and other infrastructure data streams 232 to enhance the determination of safety envelope placement. For example, the AVPMS 200 can utilize such data and information to determine that following distance needs to be longer based on road slope, whether the temperature has recently dropped below freezing, etc.

The AVPMS 200 can include an on-board data log 234 that can receive and store sensor input data from the supervisor monitoring sensors 214, the perception sensors 216, and/or the vehicle status and motion sensors 218. The data log 234 can receive and store information from the perception module 220, the safety envelope monitor 222, and/or the supervisor monitor 224. Additionally, the data log 234 can record actions taken by the response system 226 and/or record communications with the V2V communication networks 228, the V2I communication networks 230 and/or the access map and other infrastructure data streams 232.

The supervisor monitor 224 can cooperate with the supervisor monitoring sensors 214 to observe the human supervisor. The supervisor monitoring sensors 214 can be configured to monitor steering wheel pressure, gaze tracking, facial expression recognition, posture, and other similar parameters. The supervisor monitor 224 can be configured to log supervisor inattention events that last longer than a predetermined threshold in the data log 234. In this exemplary embodiment, the supervisor monitor 224 is configured to log supervisor inattention events that last one second or longer.

In some embodiments, the supervisor monitor 224 can be configured to detect supervisor inattention when a breach of a safety envelope, such as safety envelope 114 shown in FIG. 1, occurs. The detection of supervisor inattention that is coincident to a breach of the safety envelope 114 can indicate that the actions taken by the response system 226 in response to a breach of the safety envelope 116 shown in FIG. 1 is ineffective. Additionally, such failures can indicate that the trigger corresponding to safety envelope 116 is too close to the trigger that corresponds to safety envelope 114 and does not give a human supervisor sufficient time to respond to avoid an incident. Such failures can further indicate that the supervisor monitor 224 is incorrectly detecting supervisor attention when the supervisor is not actually attentive.

In other embodiments, the supervisor monitor 224 can record the state of a human supervisor in conjunction with any second triggering event. The AVPMS 200 and the supervisor monitor 224 can use the recorded data to evaluate the effectiveness of supervisor observation data to evaluate the effectiveness of AV systems that include human supervisors. In such embodiments, a high rate of occurrence of second triggering events, such as when a human supervisor fails to intervene before sounding an audible alarm, while the supervisor monitor 22 indicates the supervisor is paying attention, can be used to detect a problem with the supervisor monitoring sub-systems. In such embodiments, the rate of coincident supervisor failures and observation failures is incorporated into the vehicle safety record, and a single such event can indicate a potential flaw in the supervisor observation technology.

In other alternative embodiments, the supervisor monitor 224 can log the state of the human supervisor in conjunction with a violation of the safety envelope 118 shown in FIG. 1. Detecting human supervisor inattention corresponding to such events can be used in conjunction with the logging of violations of the safety envelope 114 and/or the safety envelope 116 shown in FIG. 1 to detect near-miss supervisor inattention events.

As shown in FIGS. 2-3, the AVPMS 200 can cooperate with a perception evaluation system 236. The perception evaluation system 236 can process a plurality of versions of perception outputs that can include temporal offsets, different image augmentations, and similar outputs to detect perception algorithm weaknesses and failures. This technology for Perception Monitoring (PM) is described more completely in international patent application Ser. No. PCT/US19/59619, the entire specification of which is incorporated by reference herein.

The combination of the AVPMS 200 and the perception evaluation system 236 provides additional benefits, beyond the functionality of the perception evaluation system 236 standing alone. In such embodiments, the AVPMS 200 can log results from the perception evaluation system 236, such as whether a particular augmented perception sensor image produces a different classification than the un-augmented version of that image.

Then, the AVPMS 200 can associate those results with various triggers for the AVPMS 200. The triggers can be associated with a detection of perception failure by the perception evaluation system 236 to provide additional information regarding failures by the autonomy system and/or the human supervisor. In one exemplary embodiment, a third trigger failure, such as when a human supervisor lets the vehicle get close to experiencing a second trigger, can be associated with a fault detection by the perception evaluation system 236. Such fault detections can indicate that both the autonomy and the human had difficulty detecting or failed to react to a particular situation.

Figure 4:
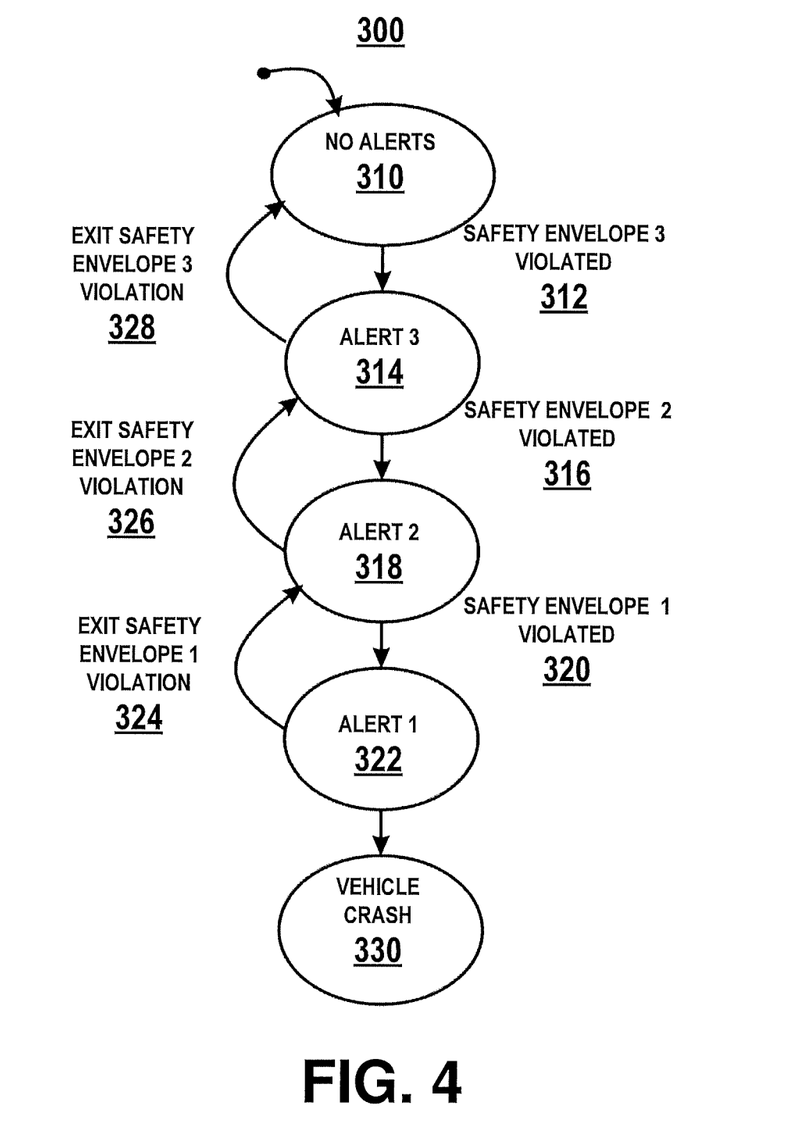
FIG. 4 is a schematic diagram of a statechart illustrating transitions that occur as the system experiences safety envelope violations.

Referring to FIG. 4 with continuing reference to the foregoing figures, a statechart, generally designated with the numeral 300, depicts the different operational modes for an AVPMS. The AVPMS can be the AVPMS 120 shown in FIG. 1 and/or the AVPMS 200 shown in FIGS. 2-3.

The initial state corresponds to a No Alerts (i.e., safe) mode 310. At 312, the boundary of a safety envelope 3 is violated, which results in the issuance of an Alert Type 3 state 314. At 316, the boundary of a safety envelope 2 is violated, which results in the issuance of an Alert Type 2 state 318. At 320, the boundary of a safety envelope 1 is violated, which results in the issuance of an Alert Type 1 state 322. When recovery or mitigation actions reduce the risk of a collision, the system traverses arcs 324-328 as violations of safety envelopes 1 through 3 are resolved. If the vehicle crashes the system transitions to state 330. Each state causes the system to take action including logging data and, in this exemplary embodiment, in states 318 and 322, annunciating a safety violation to the human safety supervisor Referring now to FIGS. 1-4, the first trigger signals that the autonomy function has crossed the threshold for a first safety envelope 114, into in an unsafe position e.g., according to an RSS equation based on AV detection, reaction, and mitigation times for a particular hazardous situation. In this exemplary embodiment, Newtonian mechanics can be used to compute the maximum safe following distance for a worst-case panic stop of a leading vehicle for a given coefficient of friction, given braking ability, autonomy reaction time, and other parameters. In safe on-road operation, such a threshold should never be crossed.

In some embodiments, an autonomy malfunction can result in such a dangerous situation. To the extent that the AVPMS 120 and/or the AVPMS 200 has the ability to detect such a situation, a first trigger can provide useful information and, in this exemplary embodiment, cause the AVPMS 120 and/or the AVPMS 200 to log the violation, trigger an alternate automatic safety maneuver (e.g., independently activate an automatic emergency braking system with an amount of deceleration appropriate to the situation), and announce an autonomy safety violation to a human supervisor.

In many circumstances it is likely that no mishap would result if a safety envelope violation is minor. For example, if the ego vehicle 112 encroaches one meter closer than is safe according to RSS following distance equations, a collision will only happen if the leading vehicle 110 performs a maximum-deceleration panic braking maneuver before the ego vehicle 112 can increase its following distance. Panic braking maneuvers are rare, however, so there is a high probability no crash will happen, especially if the human supervisor intervenes to increase following distance. Thus, any automated vehicle response to a safety envelope violation is preferably proportional to the risk presented by the situation rather than an extreme maneuver. For example, a first trigger violation of following distance can cause the AVPMS 120 and/or the AVPMS 200 to reduce speed proportional to the size of the violation rather than necessarily invoking a full-force panic stop. In an embodiment, a violation of the first safety envelope 114 causes the vehicle to perform reduced-control-authority (less than maximum) braking in an attempt to exit the safety envelope 114 within 500 msec. If this is impossible, then a maximum-control-authority emergency response is executed.

As indicated in FIGS. 1-4, a second trigger is the point at which the supervisor has unsafely permitted the AV to cross inside the second safety envelope 116, The dimensions of the safety envelope 116 are determined by considering the time for a safety supervisor to detect, diagnose, and respond to an autonomy failure. The dimensions are further determined by incorporating the supervisor response time, including detection, re-engagement, and risk mitigation of a human supervision, and the announcement of a warning. The dimensions of the safety envelope 116 further depend upon the likelihood that a human supervisor will brake with less than full braking capability of the vehicle, which can correspond to a lower braking force for the ego vehicle 112 compared to an autonomy function which commands maximum possible braking force. In other words, safety envelope 116 is designed to delineate the threshold distance at which the human safety supervisor should intervene to avoid a crash assuming that the AV control system will fail when safety envelope 114 is breached.

When an object crosses this second threshold corresponding to the safety envelope 116, the AVPMS 120 and/or the AVPMS 200 can log the event and announces the event to the human supervisor via a flashing red indicator light and an audible buzzer signal to indicate to the human that a supervision failure event has already occurred, with the hope that the human supervisor will mitigate the dangerous condition before a mishap can occur (e.g., human supervisor intervenes to increase following distance in the hope that the lead vehicle does not happen to panic brake before this maneuver can be completed). The AVPMS 200 can log the event using the response system 226 and/or in the data log 234. The AVPMS 200 can announce the event to the human supervisor using the response system 226. The second threshold can be triggered by following too close to the leading vehicle 110 or failing to stop in time to avoid a fixed road obstacle (not shown).

In some embodiments, the AVPMS 120 and/or the AVPMS 200 will not initiate a mitigation maneuver (e.g., does not trigger AEB) since the announcement is intended to elicit a safety supervisor response before safety envelope 114 is breached. In such embodiments, the second trigger, which corresponds to a violation of the safety envelope 116, prompts the human supervisor to react. In such embodiments, it is expected that reaction to this prompt is likely faster than the time delay of noticing a risky situation without such prompting.

The safety envelope 116 has dimensions that are set to permit time for the human supervisor to react and bring the AVPMS 120 and/or the AVPMS 200 back to a safe state. In general, each activation of this second trigger should be considered as a failure of a human supervisor to assure the safety of the vehicle.

Continuing with reference to FIGS. 1-4, there are a number of significant differences between this exemplary response to a violation of the safety envelope 116 by the AVPMS 120 and/or the AVPMS 200 and a SPMS. For example, the reaction time of the supervisor can be incorporated into the safety envelope 116, which requires a different calculation. In such embodiments, the reaction time is longer because it must allow time for the human supervisor to detect and respond to an autonomy failure.

In certain embodiments, the AVPMS 120 and/or the AVPMS 200 can include a second layer of protection in the form of the autonomy that is available to prevent collisions. In such embodiments, the AVPMS 120 and/or the AVPMS 200 can initiate only warnings, instead of a safety maneuver when the safety envelope 116 is violated.

Additionally, in an embodiment, the trigger may not be based on safety margins appropriate for a human driver mistake, but rather safety margins appropriate for a human to supervise potential autonomy malfunctions. Such margins can include, for example, autonomy erroneously commanding full acceleration or full steering authority, rather than a more common human driving failure of not noticing that a slightly high constant speed for the ego vehicle 112 results in encroachment upon the leading vehicle 110.

The size of any emergency response automatically triggered by a violation of the safety envelope 116 can be below the maximum vehicle control authority, but forceful enough to act as additional means of engaging the human supervisor to get his or her attention. The exact values will depend upon the characteristics of the vehicle and/or the vehicle installation.

It should be understood that in any situation in which braking reduces the risk of a vehicle crash 330 with decreased braking authority rather than full braking authority, braking at an example deceleration of 0.1 is initiated with the brakes being applied as quickly as possible to produce the maximum practical jerk from the application of brakes. Applying the brakes in this manner can ensure that the human supervisor is aware of the automatic braking procedure having been performed, without resulting in overly high actual braking deceleration.

As shown in FIGS. 1-4, the AVPMS 120 and/or the AVPMS 200 can activate a third trigger when the safety envelope 118 is violated. For example, the AVPMS 120 and/or the AVPMS 200 can be configured with the third trigger being set at a larger following distance than the second trigger. In such embodiments, the safety envelope 118 has predetermined dimensions corresponding to a predetermined amount of time before the safety envelope 116 is expected to be violated, which corresponds to 250 milliseconds in this exemplary embodiment. In such embodiments, the AVPMS 120 and/or the AVPMS 200 can log an event in a vehicle performance log, such as data log 234, for later analysis without announcing a fault to the supervisor.

The AVPMS 120 and/or the AVPMS 200 can utilize violations of the safety envelope 118 to determine "near miss" situations, incidents, and similar events, in which the human supervisor lets an external object, such as leading vehicle 110, get very close to the ego vehicle 112 and/or violating the safety envelope 116 before the human supervisor intervened or an autonomous control system reacted. The data obtained from such events does not necessarily indicate a lapse in human safety supervisor performance, but rather indicates that the autonomous control system has put the vehicle into a comparatively higher risk situation. Such events can indicate a need for a post-mission review of autonomy and/or supervisor performance.

Additionally, the recording of "near miss" third trigger events can be used in conjunction with supervisor disengagement actions to pre-screen for "valid" disengagements. In other words, third trigger event associated with a human supervisor disengagement is likely to correspond to a true positive autonomy malfunction compared to a supervisor disengagement without a third trigger event. In alternate embodiments, the trigger time can be lengthened, or a succession of triggers and progressively larger expected times to second safety envelope violations is monitored to develop a profile of different severities of near misses.

As indicated in FIGS. 1-4, the AVPMS 120 and/or the AVPMS 200 can be configured to set the second and third trigger false alarm rates higher than they would be for a SPMS-type system. Such settings can help resolve two common problems with false alarm rates in active safety and emergency braking applications, such as false positives that result in alerts and/or activation of emergency safety maneuvers.

The first problem is that frequent false alarms (e.g., false positive safety envelope violations that trigger alarms and/or vehicle risk mitigation maneuvers) cause human operators to discount or even completely ignore future alarms, including true positive alarms. The second problem occurs when frequent false alarm activations of emergency vehicle maneuvers, such as panic braking, increases the risk of causing secondary mishaps, such as a rear-end collision from a trailing vehicle. While a SPMS-type system can be tuned to minimize false alarms, even at the expense of missing many legitimate safety violations, such systems have high false negative rates.

False alarm rates can be adjusted by, for example, changing the detection threshold for environmental objects. For example, a sensor fusion algorithm can declare that a vehicle is preceding the ego vehicle only if detection confidence is above 75%. Lowering the detection confidence to, for example, 25% would increase the number of detections (true positives), but would also be expected to increase the number of false alarm detections (e.g., false positives in which an imminent collision is declared even though no leading vehicle is actually present).

To the extent that the AVPMS 120 and/or the AVPMS 200 is attempting to measure human supervisor performance rather than underlying autonomy performance, an elevated false alarm rate is more desirable. In particular, the trigger alarms that are associated with the violation of safety envelope 118 do not affect the vehicle or the supervisor. Additionally, such events merely require a minimal amount of additional analysis.

It can be advantageous to have the AVPMS 120 and/or the AVPMS 200 configured to accept a higher false negative rate to achieve a higher true positive rate than a comparable SPMS-type system. In such embodiments, the detection thresholds can be set to achieve a 50% expected false positive rate in initial deployment. The thresholds can be further adjusted based upon the observed results.

Similarly, the AVPMS 120 and/or the AVPMS 200 can be configured to set a false positive rate for violations of the safety envelope 116 at a threshold that is higher than for a SPMS-type system. In such embodiments, a preferred initial deployment setting of 33% expected false positive rate (i.e., two true positives for every false positive). Thresholds can then be adjusted from that point based on operational experience, if desired.

The benefits of using the AVPMS 120 and/or the AVPMS 200 will motivate including the invention in a number of different configurations. Partially autonomous vehicles (e.g., SAE J3016 Level 2 vehicles which require continuous supervisor monitoring) can advantageously include the described functionality as part of their built-in autonomy. This will help ensure appropriate human supervisor monitoring behavior. In such a system, the AVPMS 120 and/or the AVPMS 200 can share the vehicle control autonomy perception system to reduce cost, or alternately includes a diverse perception system to improve independence between autonomy and AVPMS operation.

In embodiments of systems that include multiple perception elements (e.g., for the purpose of executing a risk minimizing maneuver), the AVPMS 120 and/or the AVPMS 200 can use the secondary perception system that already is built into the vehicle while the normal vehicle control autonomy uses the primary perception system to both improve autonomy via detecting field failures and ensure that the secondary system is healthy via continuously monitoring its operation. In some embodiments, the AVPMS 120 and/or the AVPMS 200 can have interface with dedicated computing facilities, while sharing autonomy sensor data with other autonomy functions to reduce cost.

The AVPMS 120 and/or the AVPMS 200 can be configured for SAE Level 4 and Level 5 test platforms as an addition to any monitoring capabilities that might be built into the production vehicle, an AVPMS is a separate add-on hardware and software system that can use independent sensors and computational hardware. This arrangement minimizes intrusion into the baseline vehicle design and is especially suitable for on-road testing of SAE Level 4 and 5 vehicles in which human supervisor monitoring is only required during testing, permitting removal of the AVPMS and consequent cost reduction for at-scale production.

Figure 5:
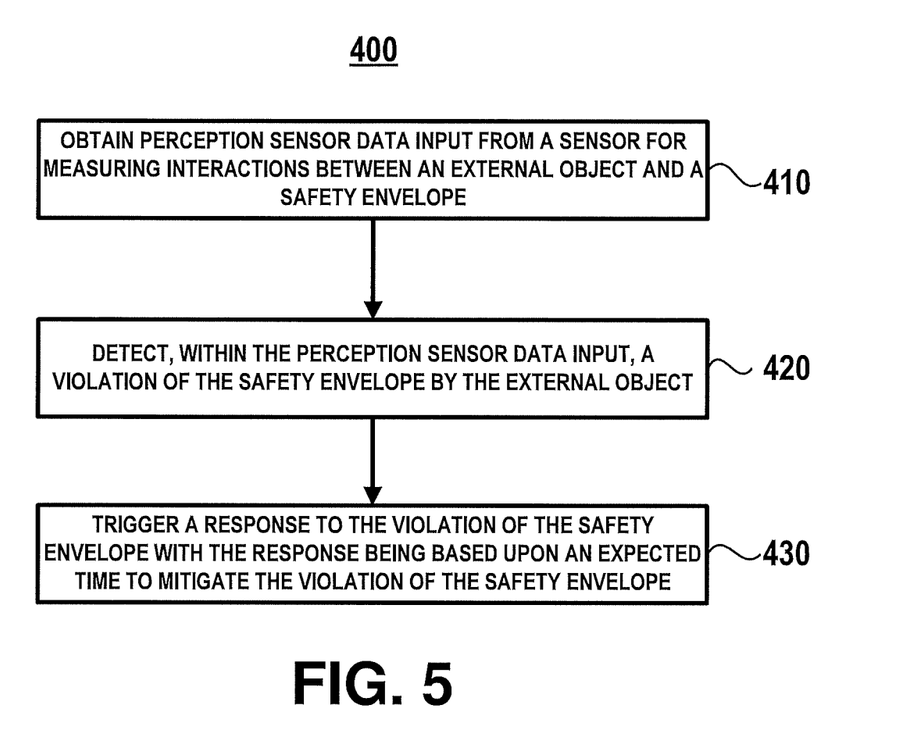
FIG. 5 is an exemplary process in accordance with the disclosure.

The system as described herein is designed to perform an overall method 400, as broadly set forth in FIG. 5. First, perception sensor data input is obtained from a sensor for measuring interactions between an external object and a safety envelope at 410. Then, a violation of the safety envelope by the external object is detected within the perception sensor data input at 420. Finally, at 430, a response to the violation of the safety envelope is triggered with the response being based upon an expected time to mitigate the violation of the safety envelope. As discussed herein, this process can be modified for specific purposes and this FIG. 5 is not intended to supplant any of the previously discussed methods; rather, it is intended to be an example of a method that is consistent with the present disclosure. This method can detect human supervisor failures in autonomous system operations.

Additional alternate embodiments include, without limitation, the use of a SPMS-type system that combines alerts with detections from a perception monitoring capability to identify when perception failures have contributed to triggering a SPMS-type alert. Such embodiments can use a SPMS-type system combined with one or both of a SM human supervisor monitoring system and/or a PM perception monitoring system to monitor and enhance the safety of an AV.

Other alternative embodiments include, without limitation, the AVPMS utilizes a predetermined third trigger threshold in which the expected time to crossing the second trigger is recorded and stored with each logged disengagement. Such log entries provide a metric for how closely the human supervisor approached the second trigger threshold. The expected time to cross the second trigger threshold can be determined, alternatively, from vehicle data logs, rather than being computed and stored during vehicle operation.

Additional alternative embodiments include, without limitation, one or more additional triggers in addition to the third additional trigger, with any such additional triggers having different envelope sizes, but similar functionality.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the claims.

What is claimed is:

1. A system for detecting human supervisor failures in autonomous system operations comprising a memory or other data storage facility and one or more processors configured to perform the steps of:

surrounding a vehicle with a plurality of safety envelopes that includes a first safety envelope, a second safety envelope, and a third safety envelopes with the first safety envelope having a perimeter that exceeds a perimeter of the second safety envelope and the third safety envelope and with the second safety envelope perimeter exceeding the third safety envelope perimeter;

obtaining, on the vehicle, perception sensor data input from a plurality of perception sensors for measuring interactions between an external object and the plurality of safety envelopes and vehicle motion input from a plurality of vehicle motion sensors;

configuring a plurality of supervisor monitoring sensors to obtain human supervisor observation input to monitor a human supervisor for the vehicle;

augmenting, with a perception evaluation system for processing image and video analysis, the perception sensor data input with at least one of temporal offset output and image augmentation output to produce augmented perception sensor data input to increase the probability that a violation of the safety envelope by the external object will be detected;

detecting, within at least one of the perception sensor data input, the vehicle motion input, and the augmented perception sensor data input, a violation of at least one of the plurality of safety envelopes by the external object;

detecting engagement of the human supervisor through a review of the human supervisor observation input;

identifying occurrences of near miss situations within at least one of the perception sensor data input, the vehicle motion input, and the human supervisor observation input;

adjusting dimensions of the first safety envelope perimeter, the second safety envelope perimeter, and the third safety envelope perimeter according to the vehicle motion input, the perception sensor data input, the augmented perception sensor data input, the human supervisor observation input, occurrences of near miss situations, and an anticipated reaction time for the human supervisor to mitigate the violation of the safety envelope;

triggering one or more responses to control the vehicle in response to the violation of the at least one of the plurality of safety envelopes in conjunction with the observed engagement of the human supervisor; and logging the perception sensor data input with the augmented perception sensor data input and with human supervisor data from the plurality of supervisor monitoring sensors, so that faults with the one or more responses can be identified.

2. The system of claim 1, wherein the one or more responses includes activating an automatic safety maneuver.

3. The system of claim 1, wherein the one or more responses includes warning the human supervisor.

4. The system of claim 1, wherein the plurality of vehicle sensors includes a sensor selected from the group consisting of LIDAR sensors, video sensors, infrared video sensors, ultrasonic sensors, and radar sensors.

5. The system of claim 1, wherein the memory or other data storage facility and the one or more processors are configured to perform the additional steps of: determining a supervisor inattention event based on the human supervisor observation input.

6. The system of claim 1, wherein the perimeter of the first safety envelope is initially set to be proportional to a threshold risk that the vehicle will crash into a leading vehicle when the leading vehicle performs a high deceleration braking maneuver, the perimeter of the second safety envelope is initially set to a second threshold risk that the vehicle will crash into the leading vehicle because the vehicle is within a first predetermined distance of the leading vehicle, and the perimeter of the third safety envelope is initially set to a third threshold risk that the vehicle will crash into the leading vehicle because the vehicle is within a second predetermined distance of the leading vehicle.

7. The system of claim 1, further comprising instructions to perform the step of:

communicating with at least one of a vehicle-to-vehicle communication network and a vehicle to infrastructure communication network to further adjust the dimensions of the first safety envelope perimeter, the second safety envelope perimeter, and the third safety envelope perimeter.

8. A computer-implemented method for detecting human supervisor failures in autonomous system operations comprising:

surrounding a vehicle with a plurality of safety envelopes that includes a first safety envelope, a second safety envelope, and a third safety envelopes with the first safety envelope having a perimeter that exceeds a perimeter of the second safety envelope and the third safety envelope and with the second safety envelope perimeter exceeding the third safety envelope perimeter;

obtaining, on the vehicle, perception sensor data input from one or a plurality of sensors for measuring interactions between an external object and the plurality of safety envelopes;

augmenting, with a perception evaluation system for processing image and video analysis, the perception sensor data input with at least one of temporal offset output and image augmentation output to produce augmented perception sensor data input to increase the probability that a violation of the safety envelope by the external object will be detected;

detecting, within at least one of the perception sensor data input and the augmented perception sensor data input, a violation of a safety envelope by the external object;

observing engagement of a human supervisor with the autonomous system and occurrences of near miss situations;

adjusting dimensions of the first safety envelope perimeter, the second safety envelope perimeter, and the third safety envelope perimeter according to velocity of the vehicle, the perception sensor data input, the augmented perception sensor data input, occurrences of near miss situations, and an anticipated reaction time for the human supervisor to mitigate the violation of the safety envelope;

triggering one or more responses to control the vehicle in response to the violation of the at least one of the plurality of safety envelopes in conjunction with the observed engagement of the human supervisor; and logging the sensor data input with the augmented perception sensor data input, so that faults with the one or more responses can be identified.

9. The method of claim 8, further comprising activating an automatic safety maneuver.

10. The method of claim 8, further comprising warning the human supervisor.

11. The method of claim 8, further comprising configuring at least one of the one or a plurality of sensors to collect data relating to external objects.

12. The method of claim 8, wherein at least one of the one or a plurality of sensors is selected from the group consisting of a supervisor monitoring sensor and a vehicle status and motion sensor.

13. The method of claim 8, wherein at least one of the one or a plurality of sensors is a sensor selected from the group consisting of LIDAR sensors, video sensors, infrared video sensors, ultrasonic sensors, and radar sensors.

14. The method of claim 8, further comprising:

determining a supervisor inattention event based on the engagement of the human supervisor.

15. The method of claim 8, further comprising:

initially setting the perimeter of the first safety envelope to be proportional to a threshold risk that the vehicle will crash into a leading vehicle when the leading vehicle performs a high deceleration braking maneuver;

initially setting the perimeter of the second safety envelope to a second threshold risk that the vehicle will crash into the leading vehicle because the vehicle is within a first predetermined distance of the leading vehicle; and initially setting the perimeter of the third safety envelope to a third threshold risk that the vehicle will crash into the leading vehicle because the vehicle is within a second predetermined distance of the leading vehicle.

* * * * *